May 7, 1968  C. BARASSI ET AL  3,381,734
REMOVABLE TREAD TIRE FOR ICY GROUND
Filed Jan. 12, 1966  2 Sheets-Sheet 1

INVENTORS
Carlo Barassi,
Giulio Cappa

BY *Stevens, Davis, Miller & Mosher*
ATTORNEYS

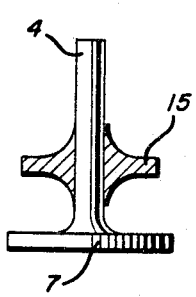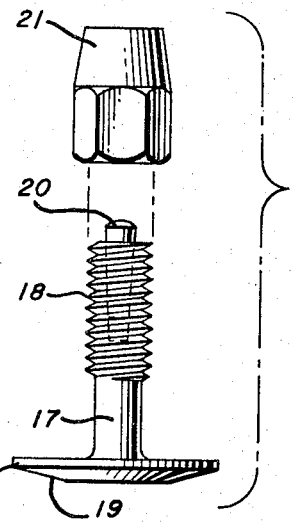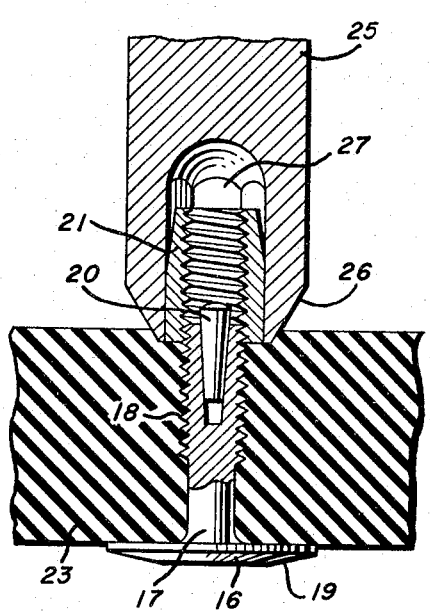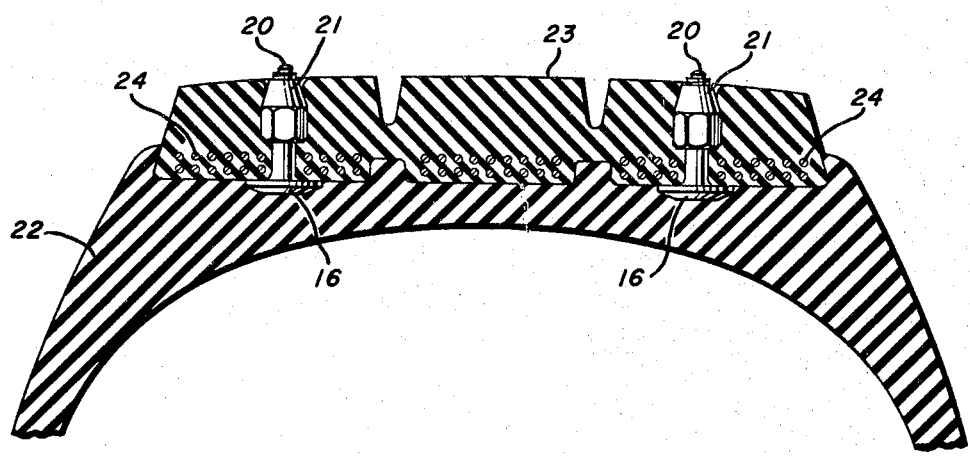

United States Patent Office 3,381,734
Patented May 7, 1968

3,381,734
REMOVABLE TREAD TIRE FOR
ICY GROUND
Carlo Barassi and Giulio Cappa, Milan, Italy, assignors to
Pirelli S.p.A., Milan, Italy
Filed Jan. 12, 1966, Ser. No. 520,225
Claims priority, application Italy, Feb. 2, 1965,
2,317/65
8 Claims. (Cl. 152—176)

ABSTRACT OF THE DISCLOSURE

A pneumatic tire having a carcass, a reinforced removable tread ring carried by the carcass, and a plurality of spikes extending through the ring and being secured therein, one end of each of the spikes projecting from the outer surface of the tread ring, and the other end having a head formed thereon which is secured between the inner surface of the tread ring and the outer surface of the carcass.

The present invention relates to removable tread tires and more particularly to removable tread tires which can be used on icy roads under severe conditions.

In order to enable normal tires to perform satisfactorily on icy roads, it has been proposed to insert in the tread suitable anti-skid elements or "spikes" which project from the tread surface and which have a point of very hard material such as a tungsten carbide-base alloy. These known anti-skid elements, which, in their simplest form, have the shape of nails, are inserted into suitable holes provided in the tread surface, and are retained in the tread by means of their head which is forced against the walls of the hole.

These known spikes give good results under normal conditions, but under particularly severe conditions, as when the vehicle is subjected to high driving or braking torques or high transversal forces, they show a tendency to become unseated and thus are ineffective.

It is therefore an object of the present invention to provide a tire which may be used under icy road conditions having a plurality of spikes that are able to withstand very high stresses without becoming loose or unseated.

Briefly summarized, the present invention includes a pneumatic tire having a carcass and a removable tread ring extending over said carcass, and features a plurality of spikes extending through said ring. One end of each of said spikes projects outward from the tread ring and engages the road surface. A substantially flat head is formed on the other end of each of the spikes and is secured between the tread ring and the carcass. A securing member may be provided for each of said spikes for securing them in the tread ring, the securing members being fastened on the spikes from the outer surface of the tread ring. The securing member may take several forms according to various embodiments of the invention.

According to one embodiment, the spike is secured to the tread ring by means of a metallic washer which is inserted on the stem of the spike, and which has a hole of such diameter as to remain fastened on said stem. Variations of the type of washer and spike are possible, as will be discussed later.

According to another embodiment of the present invention, the securing of the spike in the tread ring may be effected by means of a nut which is embedded in the tread ring and which cooperates with a threaded surface or the spike to secure same.

Reference is now made to the accompanying drawings for a better understanding of the nature and objects of the present invention, which drawings illustrate the best modes presently contemplated for carrying out the objects of the invention and its principles, and are not to be construed as restrictions or limitations on its scope.

Figure 9:
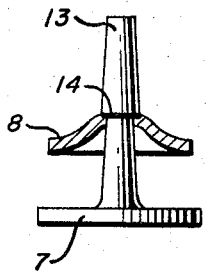

FIGS. 9 and 10 each show a side elevational and a cross-sectional view of still other forms of the spike and the washer respectively;

FIG. 11 is a side elevational view of a spike including alternate means to secure the spike to the tread ring;

FIG. 12 represents in cross-section a tire incorporating the spikes of FIG. 11;

FIG. 13 represents in cross-section a spike of FIG. 11 just prior to it being secured in the tread ring.

Figure 1:
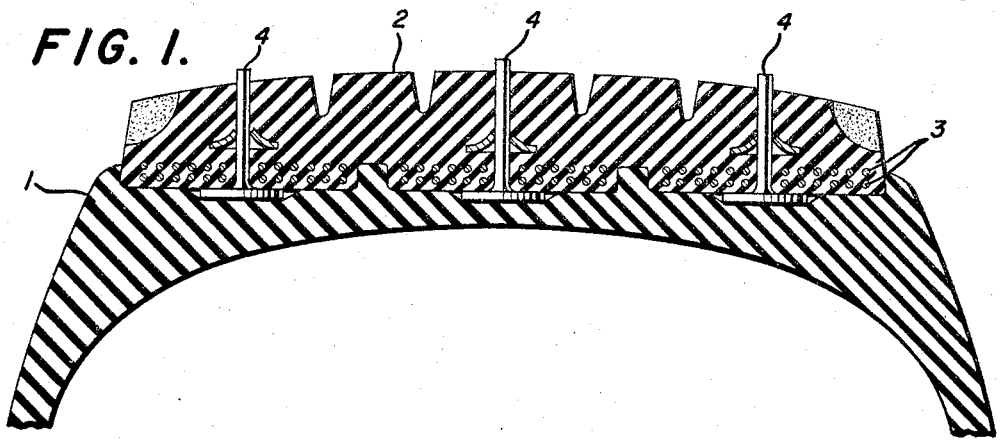
FIG. 1 is a transverse sectional view of a removable tread tire incorporating spikes secured to the tread ring by washers in accordance with the present invention.

Referring specifically to the drawings, FIG. 1 illustrates a removable tread tire including a carrying casing 1 and a tread ring 2, the latter being provided with reinforcing structures 3. A plurality of spikes 4 are provided, which may be secured in the tread ring in a manner illustrated in FIGS. 2–6. It is to be understood that any number of spikes may be utilized, only one being depicted for purposes of illustration.

Figure 2:
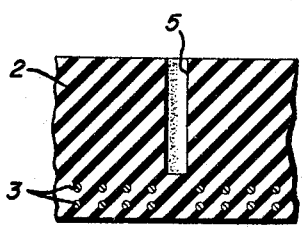
FIGS. 2–6 represent details of the tire shown in FIG. 1 during the various steps for the application of a spike.
Figure 3:
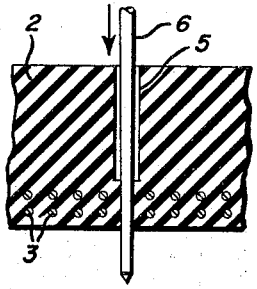
Figure 4:
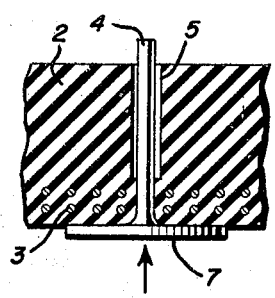

Specifically, FIG. 2 illustrates a portion of the tread ring 2 in which is provided a plurality of holes 5, each of which extends from the outer surface of the tread inwardly as far as the region in which the reinforcing structures 3 are located. The holes 5 may be formed in the tread during molding. To effect the insertion of a spike in each hole, a suitable pointed tool 6 is introduced in the hole as shown in FIG. 3. Tool 6 passes completely through hole 5 and then through the cords of the reinforcing structures 3 and produces, without removal of any material, a hole passing completely through the tread ring. As may be seen from FIG. 4, a spike 4 is then inserted in each hole. One end of spike 4 projects outwardly from the outer surface of the tread ring and the other end is provided with a substantially flat head 7 which remains secured between the inner surface of the tread ring, and the outer surface of the carcass as seen in FIG. 1.

Figure 5:
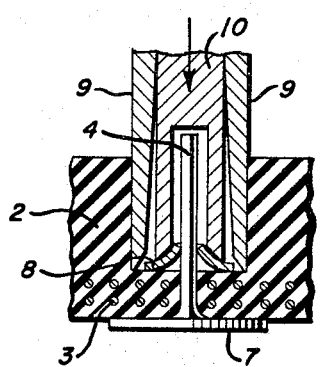

A metallic or elastic washer 8 may then be inserted on the spike in order to secure it to the tread ring. This operation may be carried out by any device known for this purpose. By way of example, FIG. 5 illustrates the application of the washer 8 by means of a hollow tool 10, which pushes the washer on the stem of the spike after points 9 have suitably enlarged the hole. The points 9 and the tool 10 are removed and the washer 8 remains fastened in place due to the fact that each washer hole is of a diameter so that the washer will be forced by friction on the stem of the spike, and due to the fact that the walls of the hole 5, owing to the elasticity of the rubber, return to their initial position thus covering the washer and the stem of the spike.

Figure 6:
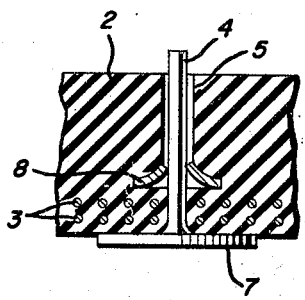

FIG. 6 illustrates the spike after it has been secured in the tread ring. It remains firmly secured in this position because its head 7 is pressed between the carrying casing and the tread ring on account of the inflation pressure of the tire, and because the reinforcing structure 3 is sandwiched between the head 7 and the washer 8.

Figure 7:
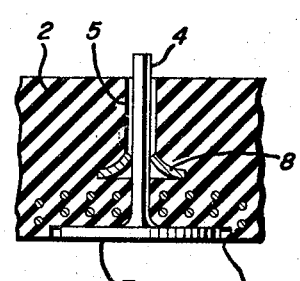
FIG. 7 is a view similar to FIG. 6, but showing a variation of the embodiment of FIGS. 1–6.

FIG. 7 illustrates a variation of the above in which a seat 11 is formed in the tread ring to house the head 7 of the spike.

Figure 8:
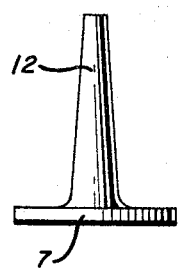
FIG. 8 is a side elevational view of another variation of the embodiment of FIGS. 1–6.

FIG. 8 illustrates a further variation according to which the stem 12 of the spike has a conical shape in order to facilitate the fastening of the washer 8 on the said stem.

Still another variation is represented in FIG. 9 in which a step 14 is provided on stem 13 of the spike to aid in the fastening of the washer on the latter. In this case, washer 8 is of an elastic material and has a smaller diameter after it has been secured in position due to its elastic deformation, thus preventing it from moving outwardly.

FIG. 10 illustrates a still further variation according to which the central portion of the washer is thicker than its outer portion so that it may be more easily introduced in the hole 5 in the tread ring.

FIGS. 11 and 12 represent an embodiment of the invention in which each spike may be formed by a head 16 and a stem 17, the latter being provided with a threaded portion 18. A hard point 20 is formed on the end of stem 17 in order to impart to the spike a better resistance to wear and a better traction on ice. Each stem 17 is inserted in a corresponding hole in the tread ring 23, from the inner towards the outer surface thereof. In this manner head 16 engages the inner surface of the tread ring 23. Nut 21 is then screwed on the threaded portion 18 of the stem 17, the softness of the rubber enabling the nut to penetrate completely in the mass of the tread, leaving only the hard point 20 projecting outwardly. When the tread ring 23 is assembled on the carrying casing 22 as seen in FIG. 12, heads 16 of the spikes are secured between the inner surface of the ring and the outer surface of the casing. The heads 16 may be beveled at 19 in order to prevent them from damaging the outer surface of the casing 22. As in the embodiments previously described, the fastening of the spikes on the tread is improved by providing a reinforcing structure 24 which remains tightened between the heads 16 and the nuts 21.

The screwing of each nut 21 on its corresponding stem 17 does not involve particular difficulties, and can be made, for example, with the tool 25 illustrated in FIG. 13. This tool is substantially a box wrench, having beveled edges 26 and a cavity 27 intended to receive the nuts 21. The tool can be turned in any way, such as by means of a mandrel and may have a beveled portion 26 to facilitate the penetration of the nuts 21 in the rubber of the tread 23.

The spikes are inserted in the tread ring when the latter is in a disassembled condition and the screwing of the nuts 21 can be carried out either while the tread ring is in a disassembled condition, or on the inflated assembled tire. If the screwing is carried out on the disassembled tread ring, the spikes may be maintained still by pushing their heads against a surface having a high friction coefficient. If the nuts are screwed on after the tire has been inflated, the inflation pressure is sufficient to maintain the spikes still.

Of course, variations of the specific construction and arrangement of this type mechanism herein disclosed can be made by those skilled in the art without departing from the invention as defined in the appended claims.

What is claimed is:

1. In a pneumatic tire having a carcass and a reinforced removable tread ring carried by said carcass, the improvement comprising a plurality of spikes extending through corresponding holes in said ring, one end of each of said spikes projecting from the other end of each of said spikes, said heads being secured between the inner surface of said tread ring and the outer surface of said carcass; and a plurality of washers disposed in said holes in said tread ring, the diameters of said washers being larger than that of said holes, each washer having a corresponding spike extending therethrough to secure said spikes with respect to said tread ring.

2. The improvement of claim 1 wherein said washers are adapted to be inserted from the outer surface of said tread ring.

3. The improvement of claim 1 wherein said washers are metallic.

4. The improvement of claim 1 wherein said holes extend from the outer surface of said tread ring to a position adjacent the reinforcing structure of said tread ring.

5. The improvement of claim 1 wherein the stems of said spikes are conical in shape.

6. In a pneumatic tire having a carcass and a reinforced removable tread ring carried by said carcass, the improvement comprising a plurality of threaded spikes extending through said ring, one end of each of said spikes projecting from the outer surface of said tread ring; a head formed on the other end of each of said spikes, said heads being secured between the inner surface of said tread ring and the outer surface of said carcass; and a nut screwed on each of said spikes and extending within said tread ring to secure said spikes with respect to said tread ring.

7. In a pneumatic tire having a carcass and a reinforced removable tread ring carried by said carcass, the improvement comprising a plurality of spikes provided with notches and extending through said ring, one end of each of said spikes projecting from the outer surface of said tread ring; a head formed on the other end of each of said spikes, said heads being secured between the inner surface of said tread ring and the outer surface of said carcass; and a plurality of washers carried by said tread ring, each washer having a corresponding spike extending therethrough with each washer engaging the notch formed in the corresponding spike to secure said spikes with respect to said tread ring.

8. In a pneumatic tire having a carcass and a reinforced removable tread ring carried by said carcass, the improvement comprising a plurality of spikes extending through said ring, one end of each of said spikes projecting from the outer surface of said tread ring; a head formed on the other end of each of said spikes, said heads being secured between the inner surface of said tread ring and the outer surface of said carcass; and a plurality of washers carried by said tread ring, the central portions of said washers being of a greater thickness than the outer portions thereof, each washer having a corresponding spike extending therethrough to secure said spikes with respect to said tread ring.

References Cited

UNITED STATES PATENTS

| | | | |
|---|---|---|---|
| 769,069 | 8/1904 | Fitzgerald | 152—176 |
| 1,381,749 | 6/1921 | Salgee | 152—211 X |
| 1,814,340 | 7/1931 | Shelton et al. | 152—176 |
| 2,981,302 | 4/1961 | Barassi | 152—211 |

FOREIGN PATENTS 547,958  10/1957  Canada.

ARTHUR L. LA POINT, *Primary Examiner.*

Y. P. SCHAEVITZ, C. B. LYON, *Assistant Examiners.*